United States Patent
Kraemer et al.

(10) Patent No.: US 11,052,485 B2
(45) Date of Patent: Jul. 6, 2021

(54) ANNULAR LASER TRANSMISSION SEAM WELDING DEVICE

(71) Applicant: JENOPTIK Automatisierungstechnik GmbH, Jena (DE)

(72) Inventors: Wilfried Kraemer, Jena (DE); Andreas Buechel, Kahla (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 389 days.

(21) Appl. No.: 16/078,521

(22) PCT Filed: Feb. 3, 2017

(86) PCT No.: PCT/DE2017/100075
§ 371 (c)(1),
(2) Date: Aug. 21, 2018

(87) PCT Pub. No.: WO2017/144048
PCT Pub. Date: Aug. 31, 2017

(65) Prior Publication Data
US 2019/0054565 A1 Feb. 21, 2019

(30) Foreign Application Priority Data
Feb. 24, 2016 (DE) .................. 10 2016 103 230.1

(51) Int. Cl.
*B23K 26/28* (2014.01)
*B23K 26/073* (2006.01)
(Continued)

(52) U.S. Cl.
CPC .......... *B23K 26/28* (2013.01); *B23K 26/0732* (2013.01); *B23K 26/0734* (2013.01);
(Continued)

(58) Field of Classification Search
CPC .... B23K 26/28; B23K 26/57; B23K 26/0732; B23K 26/0734; B23K 26/0736; B23K 26/128; B23K 33/00; H01M 2/202
(Continued)

(56) References Cited

U.S. PATENT DOCUMENTS 3,414,699 A * 12/1968 Van Gulik ............. B23K 9/205
219/95
7,285,744 B2 * 10/2007 Chen .................... B23K 26/073
219/121.63

FOREIGN PATENT DOCUMENTS

CN 1605455 A 4/2005
CN 1910007 A 2/2007
(Continued)

OTHER PUBLICATIONS

International Search Report from PCT/DE2017/100075, filed Feb. 3, 2017, dated Apr. 25, 2017.

*Primary Examiner* — Phuong T Nguyen
*Assistant Examiner* — Yeong Juen Thong
(74) *Attorney, Agent, or Firm* — Patentbar International, P.C.

(57) ABSTRACT

The device comprises a welding unit with a tube (3), a laser radiation unit (1) radiating in direction of the tube axis (3.0), and a mandrel (4) which is connected to the tube (3) via a holding unit which is formed, e.g., by two spacer elements (5.1) and which is coaxially arranged relative to and in the tube (3). The tube (3) and the circumferential surface of the mandrel (4) are reflective of the laser radiation of the laser radiation unit (1) such that through multiple reflections between the tube (3) and the mandrel (4) the laser radiation is deflected toward the beam output-side tube end (3.2) and is shaped annularly.

7 Claims, 5 Drawing Sheets

(51) Int. Cl.
*B23K 33/00* (2006.01)
*B23K 26/57* (2014.01)
*B23K 26/12* (2014.01)

(52) U.S. Cl.
CPC ........ *B23K 26/0736* (2013.01); *B23K 26/128* (2013.01); *B23K 26/57* (2015.10); *B23K 33/00* (2013.01)

(58) Field of Classification Search
USPC ............ 219/121.64, 121.63, 121.61, 121.65, 219/121.66; 156/379
See application file for complete search history.

(56) References Cited

FOREIGN PATENT DOCUMENTS

| | | | |
|---|---|---|---|
| CN | 102059454 | B | 4/2015 |
| DE | 10005593 | C1 | 10/2001 |
| DE | 102009053261 | A1 | 5/2011 |
| EP | 0087403 | A1 | 8/1983 |
| EP | 0282593 | * | 9/1988 |
| EP | 1508397 | A1 | 2/2005 |
| JP | S63-168893 | A | 12/1988 |
| JP | H11285868 | A | 10/1999 |
| JP | 3623274 | B2 | 2/2005 |
| JP | 2011020175 | A | 2/2011 |

* cited by examiner

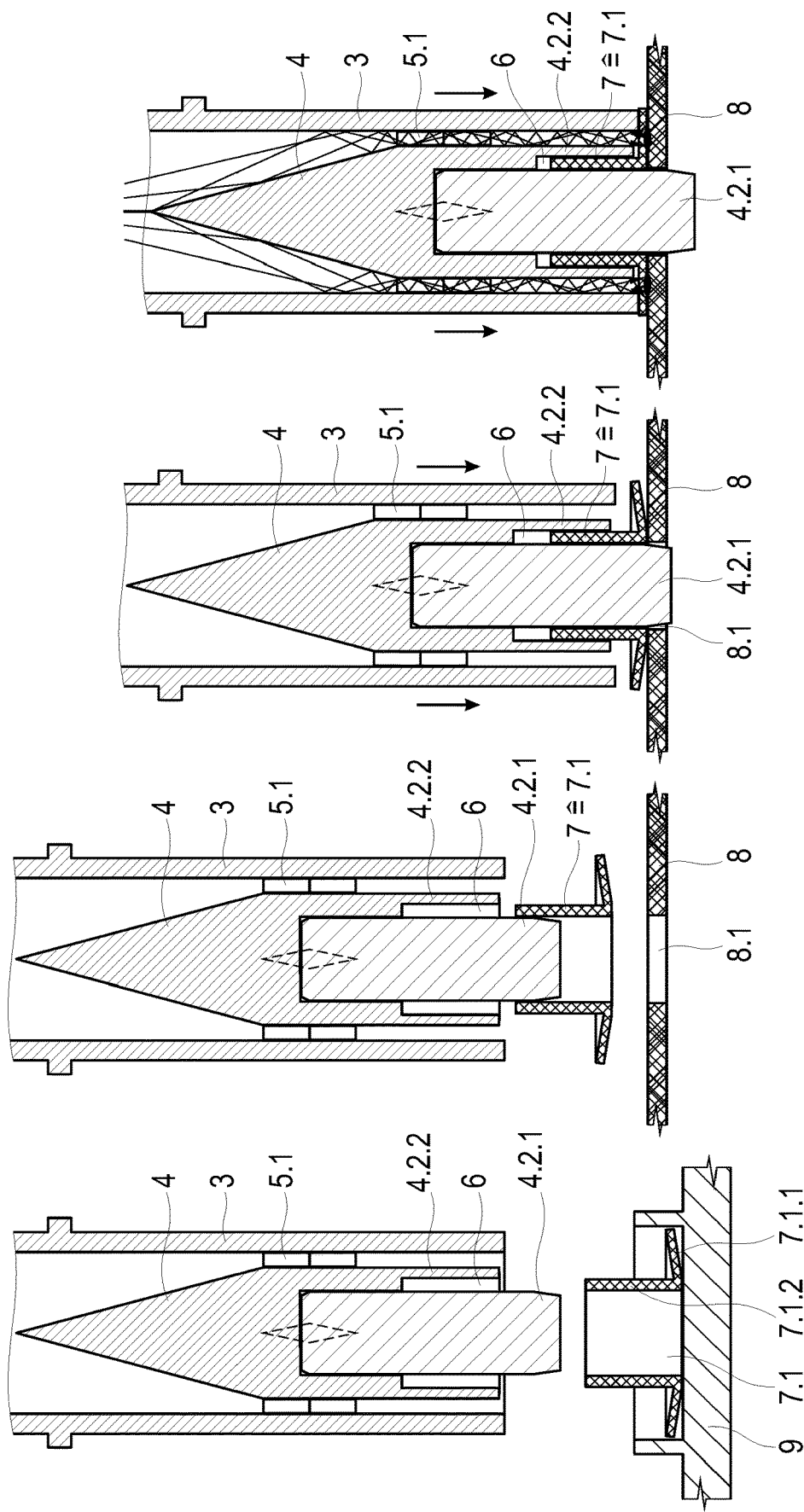

ANNULAR LASER TRANSMISSION SEAM WELDING DEVICE

RELATED APPLICATIONS

This Application is a Continuation application of International Application PCT/DE2017/100075, filed on Feb. 3, 2017, which in turn claims priority to German Patent Application DE 10 2016 103 230.1, filed Feb. 24, 2016, both of which are incorporated herein by reference in their entirety.

FIELD OF THE INVENTION

The invention is directed to a device for laser transmission welding such as is known generically from DE 100 05 593 C1.

BACKGROUND OF THE INVENTION

Regardless of the material comprised by the two component parts to be welded, it is necessary in welding that the two component parts are permanently and fixedly connected to one another via the predetermined quantity, arrangement, shape and size of the weld joints. Aside from this, in many cases of application, particularly when the welding is carried out as laser transmission welding of plastics, the weld joints should not be visible on the part of the laser-absorbing component part.

Therefore, aside from the usual requirements for tool devices such as low maintenance, lightness, and extensibility in terms of material and cost, a device for laser transmission welding which is suitable for industrial use is required to have a uniform distribution of radiation energy in the weld joints.

For weld joints having an annular weld contour, e.g., in order to weld a sleeve-shaped component part with a circumferential collar to a flat component part, this uniform distribution of radiation energy is generally achieved by means of so-called contour welding in which a laser beam is continuously guided either once or multiple times along the weld contour. An annular weld contour within the meaning of the invention is a closed ring or a plurality of ring segments which together form a ring shape. The cross section of the ring may be round, oval or angular.

A device for laser transmission welding by which an annular weld contour formed by a plurality of weld points can also be welded simultaneously is known from DE 10 2009 053 261 A1. It comprises a quantity and arrangement of welding units corresponding to the quantity and arrangement of weld points. These weld points can be ring segments within the meaning of the invention. A welding unit has an optical axis along which a high-power diode laser, beam-shaping optics and a tube are arranged, as well as a component receptacle in which the component parts to be welded are positioned with respect to one another and with respect to the welding units. The high-power diode laser, beam-shaping optics and tube are fixedly arranged with respect to one another via a housing, and the inner circumferential surface of the tube is reflective of the laser beam. The beam-shaping optics are configured such that they transform a laser beam coming from the high-power diode laser into a divergent laser beam in which, through multiple reflection at the inner circumference of the tube, the beam cross section is adapted to the cross section of the cavity of the tube and its radiation intensity distribution is homogenized over the beam cross section. Ideally, the beam-shaping optics should adapt the laser beam to the tube such that it is conveyed within the tube by total reflection.

It is also suggested that the arrangement of tubes resulting from the arrangement of the plurality of welding units be replaced by a metal block which is provided with a quantity of openings, and the quantity, arrangement and dimensioning of these openings correspond to the quantity, arrangement and dimensioning of the tubes.

It is stated that the size and shape of the weld points are determined by the size and shape selected for the cross section of the tubes or openings and that, instead of a typical round shape for a weld point, a rectangular shape can also be implemented because it would be simple to produce a tube in a correspondingly suited shape. The length of the tube should be selected in such a way that a sufficiently good homogenization occurs via the plurality of reflections inside the tube, which promises a uniformly solid weld joint within the weld point.

The tube ends of the individual welding units are pressed against the component parts to be welded. In order to enlarge the pressing surface for this purpose, it is suggested to arrange a pressing member against the free end of the tubes regardless of the tube cross section selected. Examples of a pressing member are an annular face plate, a plane plate closing the free end of the tube, or a cross element.

A device according to DE 10 2009 053 261 A1, cited above, has turned out to be disadvantageous particularly when producing a weld contour with a very large quantity of weld points which, in particular, should only be spaced apart as little as possible to form a virtually closed annular weld contour. A truly closed annular weld contour cannot be realized with the device shown here. A component receptacle, not described in more detail, in which the component parts to be welded are positioned relative to one another and relative to the welding units requires means by which the component part to be welded on is positioned and fixed with respect to the component part on which it is to be welded as well as means for positioning the welding units relative to the component parts.

SUMMARY OF THE INVENTION

It is the object of the invention to provide a device with a comparatively simpler construction by means of which an annular weld contour formed by a closed ring and by a plurality of ring segments forming a ring can be welded.

This object is met for a device for the laser transmission welding of an annular weld seam between a first component part and a second component part. The device comprises a welding unit and a laser radiation unit.

The welding unit has a tube with a tube axis, a beam input-side tube end and a beam output-side tube end. The laser radiation unit is arranged at the beam input-side tube end with a radiating direction in direction of the tube axis. An inner circumferential surface of the tube is reflective of laser radiation emitted by the laser radiation unit.

It is key to the invention that a mandrel is coaxially arranged in the tube so as to be connected to the latter via a holding unit. The mandrel has a first mandrel part facing the beam input-side tube end and a second mandrel part facing the beam output-side tube end. The first mandrel part has the shape of a right cone, a right conical frustum, a right pyramid or a right pyramidal frustum with a central angle of less than 90° opening toward the beam output-side tube end. The second mandrel part has the shape of a right cylinder or a right prism. A first base area of the first mandrel part and a second base area of the second mandrel part are adapted to one another. Circumferential surfaces of the mandrel which face the tube are reflective of the laser radiation such that through multiple reflections in an intermediate space formed between the tube and the mandrel the laser radiation is deflected toward the beam output-side tube end and is shaped annularly.

A mating part facing the beam output-side tube end is advantageously provided at the second mandrel part for a frictionally engaging plug-in connection with the first component part such that the first component part can be received with the device.

For purposes of an advantageous configuration of the frictionally engaging plug-in connection, the second mandrel part is partially divided, proceeding from the beam output-side tube end, by an annular groove into a reflector jacket and a coaxial receiving core. The first component part which is constructed, e.g., as a sleeve-shaped component part with a collar and a sleeve part can accordingly be inserted into the annular groove via the sleeve part such that the collar can be impinged by the laser radiation. In this case, the receiving core is the mating part of the frictionally engaging plug-in connection.

It is advantageous when the beam output-side tube end projects over the reflector jacket so that the collar of the inserted sleeve-shaped component part can be pressed by means of the tube against the second component part which is fed to the sleeve-shaped component part.

It is also advantageous when the receiving core protrudes beyond the beam output-side tube end such that by inserting the receiving core into the sleeve part the sleeve-shaped component part can be received by a bearing pallet through the device and can be fed to the second component part with the device.

Further advantageous constructions are indicated in the subclaims.

BRIEF DESCRIPTION OF THE DRAWINGS

Referring to the drawings, the device is described more fully in the following by way of example in connection with a sleeve-shaped component part, including circumferential collar, which is welded onto a flat component part.

The drawings show:

FIGS. 3A-3D show the handling process of a sleeve-shaped component part with a device according to the invention in a third embodiment example.

DETAILED DESCRIPTION OF THE PREFERRED EMBODIMENTS

Figure 1A:
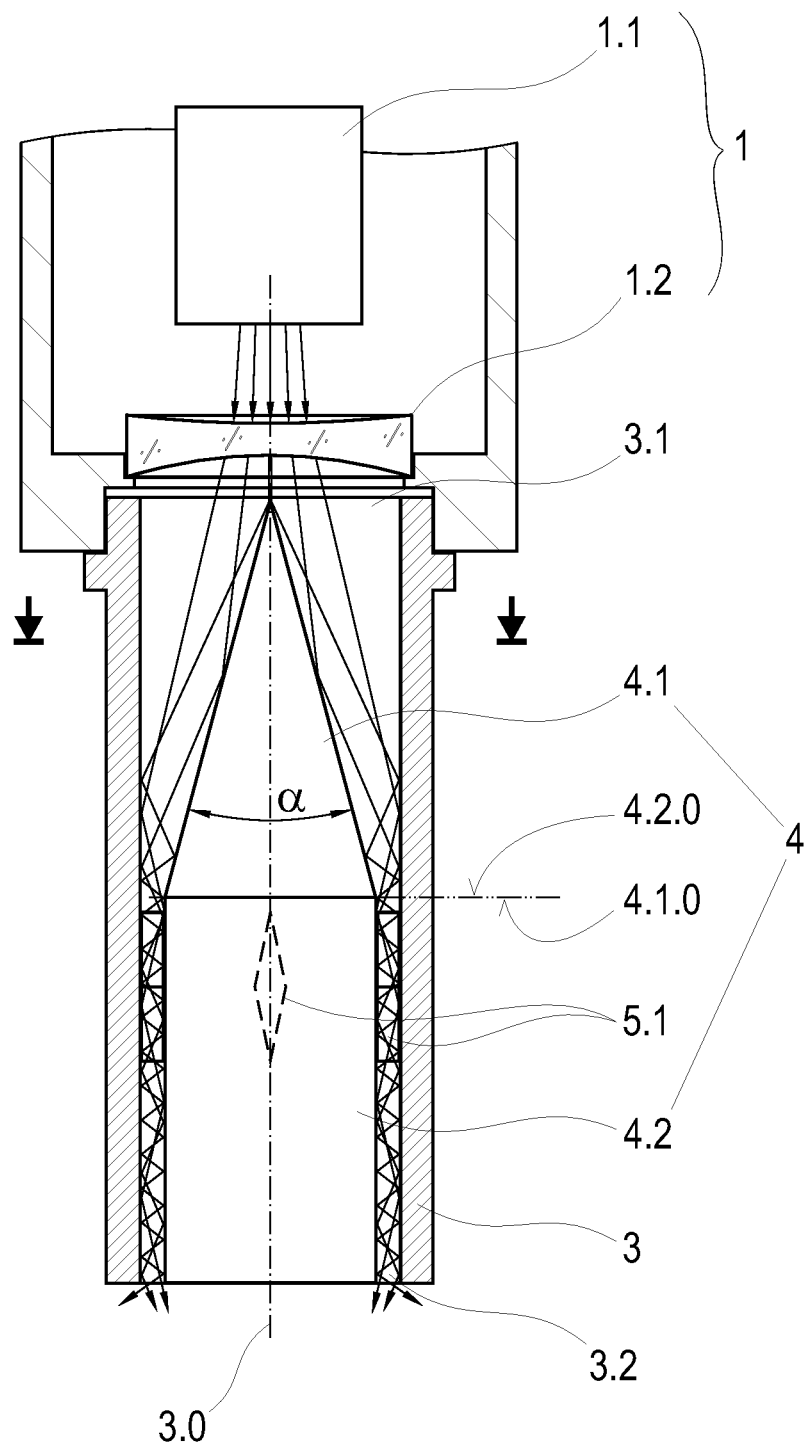
FIG. 1A shows a schematic diagram of a first embodiment example of a device according to the invention as sectional side view.

FIG. 1A shows a first embodiment example for a device according to the invention for the laser transmission welding of an annular weld seam between a first component part 7 and a second component part 8 as sectional side view which can be combined with any of the sections of a top view shown in FIGS. 1B to 1G.

The cross-sectional shapes of the device which are shown by way of example in FIGS. 1B to 1g influence the scattering of the laser radiation reflected at the latter and determine the shape of the weld seam that can be produced with the device. They can likewise be combined with all of the other configurations of the device and thus also with the second embodiment example shown in FIG. 2 or with the third embodiment example shown in FIGS. 3A to 3D.

The first embodiment example of a device according to the invention shown in FIG. 1a represents a very simple construction which is placed directly on the two component parts, namely, the first component part 7 and the second component part 8, which are already positioned relative to one another and which are to be welded together via a planar annular weld seam in order to carry out the welding.

As in all of the further embodiment examples, this embodiment example of the device also comprises a welding unit with a tube 3 having a tube axis 3.0, a beam input-side tube end 3.1 and a beam output-side tube end 3.2. A laser radiation unit 1 with a radiating direction along the tube axis 3.0 is arranged at the beam input-side tube end 3.1. The laser radiation unit 1 is formed in this instance by an individual laser radiation source 1.1 and an optical assembly 1.2 which is arranged upstream in the radiating direction thereof. The laser radiation unit 1 can also be only a laser radiation source 1.1 which already radiates with a high divergence or an arrangement of a plurality of laser radiation sources 1.1 whose laser radiation is preferably expanded by an optical assembly 1.2 or by an optical assembly 1.2 in each instance. An inner circumferential surface of tube 3 is reflective of laser radiation that is emitted by the laser radiation unit 1 and coupled into tube 3.

A mandrel 4 which is connected to tube 3 via a holding unit is arranged coaxially in tube 3. The holding unit is formed by spacer elements 5.1 in this embodiment example. The mandrel 4 comprises a first mandrel part 4.1 facing the beam input-side tube end 3.1 and a second mandrel part 4.2 facing the beam output-side tube end 3.2.

In this instance, the first mandrel part 4.1 has the shape of a right cone or a right pyramid with a central angle $\alpha$ of less than 90°. The tip of the cone or pyramid is directed toward the laser radiation unit 1. The first mandrel part 4.1 has the exclusive object of reflecting impinging laser radiation on the tube 3 such that it impinges on the latter at an angle from which it is further reflected toward the beam output-side tube end 3.2.

The second mandrel part 4.2 has the shape of a right cylinder or a right prism, and a second base area 4.2.0 of the cylinder or prism and a first base area 4.1.0 of the cone or pyramid are adapted to one another. This means that in case the mandrel 4 is a pairing of cone and cylinder or a pairing of pyramid and prism, the base areas 4.1.0 and 4.2.0 are congruent. In case the mandrel 4 is formed by a pyramid and a cylinder, the first base area 4.1.0 of the pyramid, which is basically a polygon, preferably an equilateral polygon, is adapted to the inscribed circle thereof and, therefore, to the round second base area 4.2.0 of the cylinder. Also, in case the mandrel 4 is formed by a cone and a prism, the first base area 4.1.0 of the cone, which forms a circle, is adapted to the second base area 4.2.0 of the prism, which is a polygon, preferably an equilateral polygon. The two latter combinations cause an even better scattering of the laser radiation on the path to the beam output-side tube end 3.2 and, therefore, a better homogenization of the radiation density.

Figure 1B:
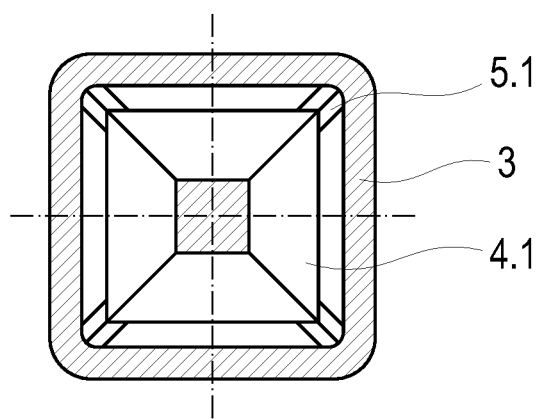
FIG. 1B-1G show schematic diagrams for different cross sections of the tube and of the mandrel as sectional top view.
Figure 1C:
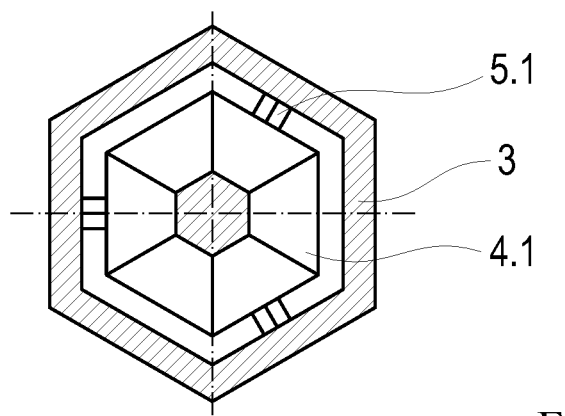
Figure 1D:
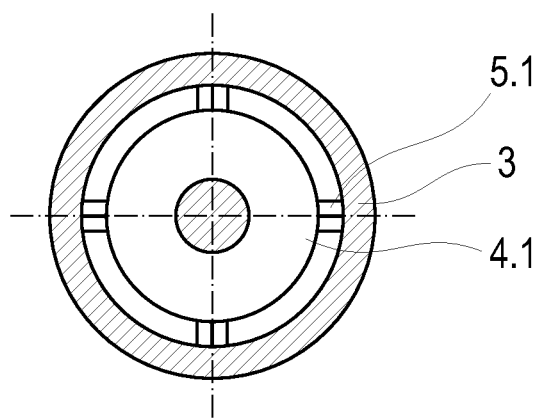
Figure 1E:
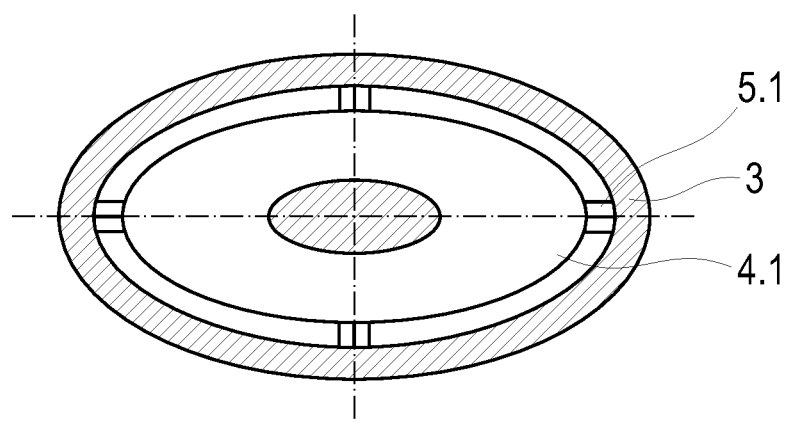
Figure 1F:
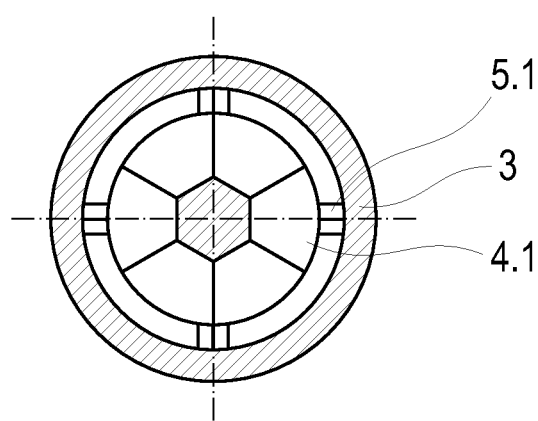
Figure 1G:
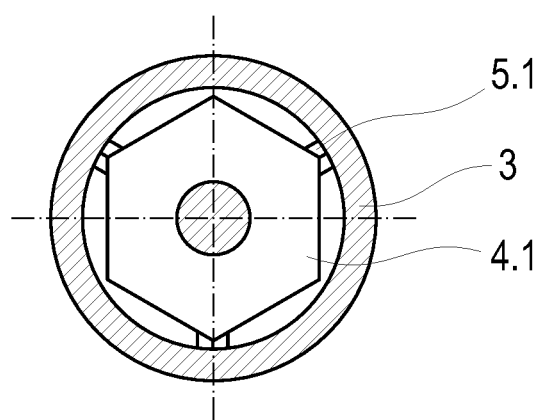

The dimensioning of the cross section of the mandrel 4 perpendicular to its longitudinal axis which coincides with the tube axis 3.0 increases lengthwise from the beam input-side tube end 3.1 to the transition of the first mandrel part 4.1 into the second mandrel part 4.2 and then remains constant. The cross sectional shape of the mandrel 4 can be adapted to the cross section of tube 3 with respect to shape as is shown in FIGS. 1b-1e or may also differ from it as is shown in FIGS. 1f-1g.

The spacer elements 5.1 span a perpendicular distance between the tube 3 and the mandrel 4 which defines the width of the resulting weld seam. The width of the weld seam is preferably constant as is shown in FIGS. 1b-1f but can also be different as is shown in FIG. 1G.

The circumferential surfaces of the mandrel 4 which face the tube 3 are reflective of the laser radiation such that the laser radiation is deflected toward the beam output-side tube end 3.2 by multiple reflections between tube 3 and mandrel 4 and is shaped annularly. The shape of the intermediate space between mandrel 4 and tube 3 at the beam output-side tube end 3.2 determines the shape of the weld seam and is annular in every case.

The end faces bounding the beam output-side tube end 3.2 and the end of the mandrel 4 facing the beam output-side tube end 3.2 advantageously lie in a plane such that they can be placed together on the two component parts 7, 8 which are already positioned relative to one another. The end faces then define an annular surface into which the laser radiation is directed. A pressing force which is introduced into the welding unit in direction of the tube axis 3.0 is transmitted to the component parts 7, 8 via the end faces such that a pressing force required for the welding results between the component parts 7, 8.

In principle, the beam output-side tube end 3.2 could also project out beyond the end of the mandrel 4 such that only the beam output-side tube end 3.2 comes in contact with the component parts 7, 8, or also only the end of the mandrel 4 could project out beyond the beam output-side tube end 3.2 so that the pressing force is transmitted into component parts 7, 8 via this beam output-side tube end 3.2. Of course, an unwanted over-irradiation of one of the edges of the weld seam and, therefore, an unwanted heating can come about, but this is comparatively negligible when there is only a slight difference in height.

A geometry defined in this way such as is obtained through the first base area 4.1.0 of a cone or pyramid is not absolutely necessary. In theory, the cross section of the mandrel 4 and of the tube 3 could also be a free-form surface, but its optical reflectivity would be unpredictable and therefore not practicable. A plurality of annular weld seams can be produced by the above-mentioned defined-cross sectional shapes permitting a high degree of freedom for the construction of the component parts 7, 8 to be welded.

The spacer elements 5.1 are configured, dimensioned and arranged depending on whether the weld contour is a closed ring or a plurality of ring segments which collectively form a ring shape.

For a weld contour presenting a closed ring, the spacer elements 5.1 must shadow the laser radiation as little as possible, for which purpose they are arranged so as to be distributed around the mandrel 4 at the beam input-side tube end 3.1 as far as possible. They are preferably narrow and executed to be reflective of the laser radiation. When a laser beam is radiated into the device by an arrangement of a plurality of laser radiation sources 1.1 and, therefore, a plurality of positions, the spacer elements 5.1 are advantageously arranged exactly midway between the laser input positions.

For a weld contour comprising a plurality of ring segments, the spacer elements 5.1 advantageously extend up to the end faces of the beam output-side tube end 3.2 and/or the end of the mandrel 4 and, in this case, also take over the function of pressing.

Figure 2:
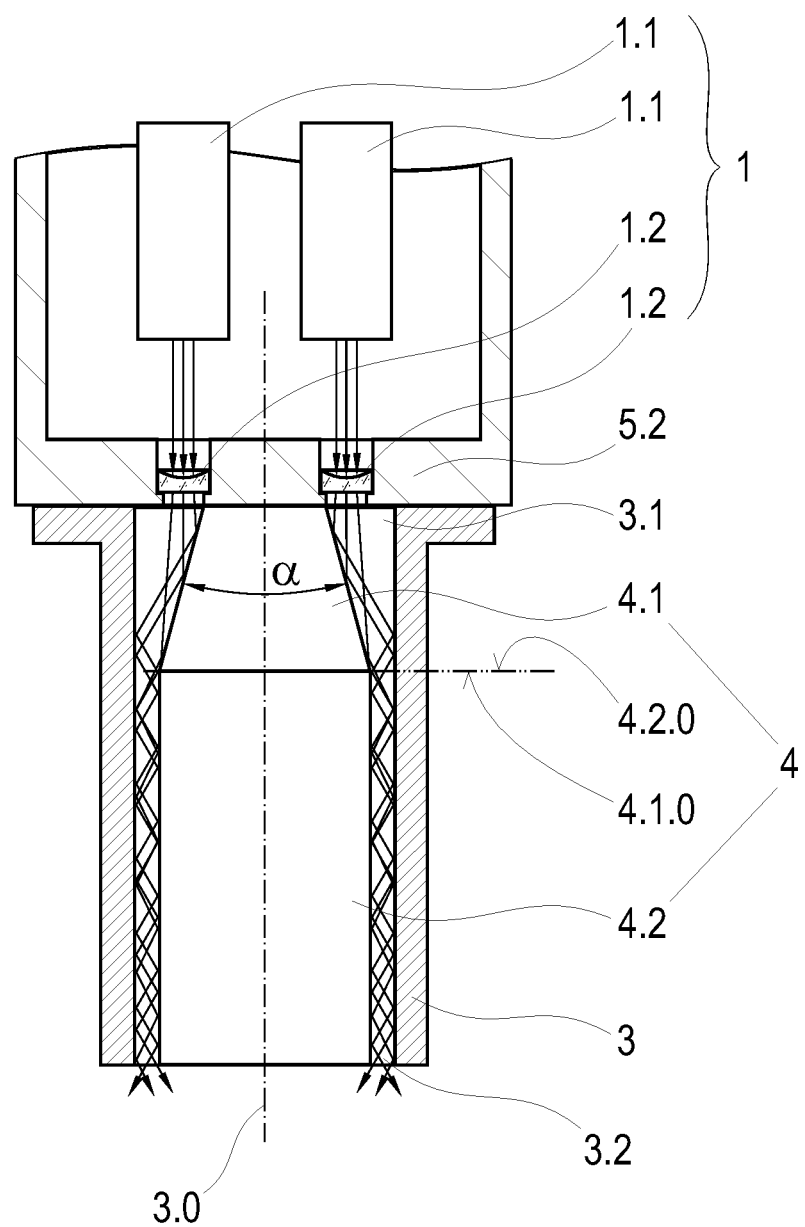
FIG. 2 shows a schematic diagram of a second embodiment example of a device according to the invention as sectional side view.

A second embodiment example shown in FIG. 2 is distinguished from the first embodiment example essentially in the configuration of the laser radiation unit 1 and the holding unit.

The laser radiation unit 1 is formed in this instance by a plurality of laser radiation sources 1.1 which are arranged, e.g., on a circular line or on the circumferential line of a polygon, an optical assembly 1.2 for beam expansion preferably being arranged upstream of every laser radiation source 1.1. It is also possible to arrange a plurality of laser radiation sources 1.1 adjacent to one another without upstream beam shaping, e.g., laser array with a plurality of bars adjacent to one another. The individual optical assemblies 1.2 are arranged corresponding to the arrangement of the laser radiation sources 1.1. The functions of holding and arranging the optical assembly 1.2 and holding the mandrel 4 coaxial to the tube 3 are advantageously performed in this instance by a holding plate 5.2 which serves as holding unit instead of the spacer elements 5.1. In contrast to the first embodiment example where the spacer elements 5.1 are located within the emission range of the laser radiation, the holding plate 5.2 is located outside of the emission range of the laser radiation in this instance. Since the laser radiation is not emitted in this case so as to be distributed over the entire cross section of the tube 3, the first mandrel part 4.1 is only constructed as a conical frustum or pyramidal frustum so that a mounting surface for the holding plate 5.2 is advantageously formed by the resulting congruent surface.

According to a third embodiment example (see FIGS. 3A-3D), in addition to the optical function of guiding the laser radiation to the component parts 7, 8 and in addition to the mechanical function of transmitting a pressing force the device should also assume a function of receiving and positioning the first component part 7 with respect to the device and, accordingly, with respect to the welding seam and the second component part 8.

The second mandrel part 4.2 is utilized for the latter purpose in that the end of the second mandrel part 4.2 facing the beam output-side tube end 3.2 is outfitted with a mating part of a frictionally engaging plug-in connection matching the first component part 7 which has the other mating part for this connection. Even if the mandrel 4 is also used as pressing means, the end face to be used for this purpose can be limited to an annular shape and the mating part for the frictionally engaging plug-in connection can be formed within the inner area enclosed by the end face.

The first component part 7 can even have a shape that can be utilized as mating part for the frictionally engaging plug-in connection. For example, this can be a sleeve-shaped component part 7.1 with a sleeve part 7.1.2 and a collar 7.1.1 formed thereon.

The third embodiment example relates to a device which is configured for the welding of a sleeve-shaped component part 7.1 of this type.

A core, hereinafter receiving core 4.2.1, which fills the sleeve part 7.1.2 is formed at the end of the mandrel 4 facing the beam output-side tube end 3.2. The sleeve part 7.1.2 and the receiving core 4.2.1 constitute the frictionally engaging plug-in connection. The receiving core 4.2.1 is surrounded coaxially by an annular groove 6 so as to be separated from a reflector jacket 4.2 so that the sleeve part 7.1.2 is not impinged by laser radiation. The annular groove 6 extends far enough into the second mandrel part 4.2 that the sleeve part 7.1.2 of the sleeve-shaped component part 7.1 can be at least almost completely received in the annular groove 6.

Also in this third embodiment example, one or two end faces can press against the first component part 7, in this case specifically the collar 7.1.1 of the sleeve-shaped component part 7.1, depending on whether the beam output-side tube end 3.2 projects beyond the reflector jacket 4.2.2 or whether, conversely, both end faces lie in a plane.

FIGS. 3*a* to 3*d* show how the sleeve-shaped component part 7.1 is received by the device and is positioned for welding in relation to the device and in relation to the second component part 8 which is plate-shaped at least in the area of the weld seam.

According to FIG. 3*a*, the sleeve-shaped component part 7.1 lies in a bearing pallet 9 on the collar 7.1.1 such that the sleeve part 7.1.2 projects upward perpendicularly. As is shown in FIG. 3*b*, the device is placed from above perpendicularly on the sleeve-shaped component part 7.1 so that the receiving core 4.2.1 is guided into the sleeve part 7.1.2. This brings about a slight expansion of the sleeve part 7.1.2 which causes a restoring force, and a frictionally engaging plug-in connection is formed between the receiving core 4.2.1 and the sleeve part 7.1.2. The device with the attached sleeve-shaped component part 7.1 is now fed to the second component part 8 to which the sleeve-shaped component part 7.1 is to be welded and is lowered onto the latter. In so doing, the sleeve-shaped component part 7.1 is pushed further onto the receiving core 4.2.1 and into the annular groove 6 until the collar 7.1.1 contacts the tube 3 or reflector jacket 4.2.2, or both. A positioning aid is advantageously provided at the second component part 8. This positioning aid can be a hole 8.1 which has been provided for other reasons and around which the collar 7.1.1 is to be welded and into which the receiving core 4.2.1 is possibly likewise inserted as is shown in FIG. 3D. Or the positioning aid can also be a ring (not shown in the figure) which is formed on the second component part 8 and into which the collar 7.1.1 fits when the device is lowered.

As has already been explained, the shape of the weld seam is determined by the selected cross section of the tube 3 and of the mandrel 4 at the beam output-side tube end 3.2. The shape can be a regular polygon, specifically a square as is shown in FIG. 1B, or a hexagon as is shown in FIG. 1C, but can also be an irregular polygon. It can also be, e.g., a circular ring as is shown in FIG. 1D or an elliptical ring as is shown in FIG. 1E.

LIST OF REFERENCE CHARACTERS

1 laser radiation unit
1.1 laser radiation source
1.2 optical assembly
3 tube
3.0 tube axis
3.1 beam input-side tube end
3.2 beam output-side tube end
4 mandrel
4.1 first mandrel part
4.1.0 first base area
4.2 second mandrel part
4.2.0 second base area
4.2.1 receiving core
4.2.2 reflector jacket
5.1 spacer element
5.2 holding plate
6 annular groove
7 first component part
7.1 sleeve-shaped component part
7.1.1 collar (of the sleeve-shaped component part 7.1)
7.1.2 sleeve part (of the sleeve-shaped component part 7.1)
8 second component part
8.1 hole (in the second component part 8)
9 bearing pallet
α central angle

What is claimed is:

1. A device for laser transmission welding of an annular weld seam between a first component part and a second component part, the device comprising:
   a welding unit with a tube, the tube having a tube axis and an inner circumferential surface of the tube being reflective of laser radiation emitted by a laser radiation unit;
   a beam input-side tube end, and a beam output-side tube end;
   the laser radiation unit arranged at the beam input-side tube end with a radiating direction in direction of the tube axis;
   a mandrel coaxially arranged in the tube and connected to the tube via a holding unit, the mandrel having a first mandrel part facing the beam input-side tube end, the first mandrel part having a first base area shaped as a right cone, a right conical frustum, a right pyramid or a right pyramidal frustum with a central angle opening toward the beam output-side tube end, the mandrel further having a second mandrel part facing the beam output-side tube end, the second mandrel part having a second base area shaped as a right cylinder or a right prism, wherein the first base area and the second base area are congruent, and wherein circumferential surfaces of the mandrel which face the tube are reflective of the laser radiation such that the laser radiation is annularly shaped and is deflected toward the beam output-side tube end through multiple reflections between the tube and the mandrel and
   a mating part facing the beam output-side tube end at the second mandrel part for frictionally engaging plug-in connection with the first component part during welding;
   the holding unit formed of at least two spacer elements which are arranged at one of the circumferential surfaces of the mandrel.

2. The device for laser transmission welding of the annular weld seam according to claim 1, wherein the laser radiation unit is formed by at least one laser radiation source and at least one upstream optical assembly for expanding a laser beam.

3. The device for laser transmission welding of the annular weld seam according to claim 2, wherein the holding unit is a holding plate arranged at an end of the first mandrel part facing the beam input-side tube end, the holding plate being held in the at least one upstream optical assembly.

4. A device for laser transmission welding of an annular weld seam between a first component part and a second component part, the device comprising:
   a welding unit with a tube, the tube having a tube axis and an inner circumferential surface of the tube being reflective of laser radiation emitted by a laser radiation unit;
   a beam input-side tube end, and a beam output-side tube end;
   the laser radiation unit arranged at the beam input-side tube end with a radiating direction in direction of the tube axis;

a mandrel coaxially arranged in the tube and connected to the tube via a holding unit, the mandrel having a first mandrel part facing the beam input-side tube end, the first mandrel part having a first base area shaped as a right cone, a right conical frustum, a right pyramid or a right pyramidal frustum with a central angle opening toward the beam output-side tube end, the mandrel further having a second mandrel part facing the beam output-side tube end, the second mandrel part having a second base area shaped as a right cylinder or a right prism, wherein the first base area and the second base area are congruent, and wherein circumferential surfaces of the mandrel which face the tube are reflective of the laser radiation such that the laser radiation is annularly shaped and is deflected toward the beam output-side tube end through multiple reflections between the tube and the mandrel, and a mating part facing the beam output-side tube end at the second mandrel part for frictionally engaging plug-in connection with the first component part;

wherein the first component part is constructed as a sleeve-shaped component part having a collar and a sleeve part, and wherein the second mandrel part is partially divided proceeding from the beam output-side tube end by an annular groove into a reflector jacket and a coaxial receiving core so that the first component part is inserted into the annular groove via the sleeve part such that the collar is impinged by the laser radiation, and wherein the receiving core is a mating part of the frictionally engaging plug-in connection.

5. The device for laser transmission welding of the annular weld seam according to claim 4, wherein the beam output-side tube end projects over the reflector jacket so that the collar of the inserted sleeve-shaped component part is pressed by means of the tube against the second component part which is fed to the sleeve-shaped component part.

6. The device for laser transmission welding of the annular weld seam according to claim 4, wherein the receiving core protrudes beyond the beam output-side tube end such that the sleeve-shaped component part is received by a bearing pallet through the device by inserting the receiving core into the sleeve part and is fed to the second component part with the device.

7. The device for laser transmission welding of the annular weld seam according to claim 5, wherein the beam output-side tube end and a free end of the reflector jacket lie in a plane such that the collar of the inserted sleeve-shaped component part also is pressed by means of the reflector jacket against the second component part which is fed to the sleeve-shaped component part.

* * * * *